United States Patent [19]

Eichhorn

[11] Patent Number: 5,779,386
[45] Date of Patent: Jul. 14, 1998

[54] APPARATUS AND METHOD FOR COUPLING SUPPORT MEMBERS

[75] Inventor: Anthony E. Eichhorn, East Amherst, N.Y.

[73] Assignee: Fisher-Price, Inc., Aurora, N.Y.

[21] Appl. No.: 698,370

[22] Filed: Aug. 15, 1996

[51] Int. Cl.$^6$ .................................................. B25G 3/18
[52] U.S. Cl. ........................ 403/329; 403/109; 403/328; 403/334; 403/377
[58] Field of Search .................................. 403/109, 326, 403/327, 238, 334, 376, 377, 22

[56] References Cited

U.S. PATENT DOCUMENTS

| | | | |
|---|---|---|---|
| 1,007,322 | 10/1911 | Barnes | 403/109 X |
| 2,124,842 | 7/1938 | Zierold et al. | 403/109 X |
| 2,463,124 | 3/1949 | Sims | 403/334 |
| 3,253,310 | 5/1966 | McCarthy | 403/326 X |
| 3,362,050 | 1/1968 | McCarthy | 403/325 X |
| 3,669,463 | 6/1972 | Boudreau | 403/109 X |
| 3,947,140 | 3/1976 | Thomas | 403/325 X |
| 4,042,305 | 8/1977 | Vincent | 403/328 X |
| 4,247,216 | 1/1981 | Pansini | 403/109 |
| 4,887,929 | 12/1989 | Hale | 403/328 |
| 4,917,442 | 4/1990 | Johnson | 301/113 |
| 5,090,837 | 2/1992 | Mower | 403/334 |
| 5,387,048 | 2/1995 | Kuo | 403/109 |
| 5,582,489 | 12/1996 | Marzio et al. | 403/325 X |

*Primary Examiner*—Daniel P. Stodola
*Assistant Examiner*—Bruce A. Lev
*Attorney, Agent, or Firm*—Morgan, Lewis & Bockius LLP; C. Scott Talbot; Howard R. Richman

[57] ABSTRACT

A joint for joining two tubes together that provides a connection that is highly resistant to relative rotational movement of the two tubes and that provides for connecting the tubes without requiring tools. A tube with a swaged end of smaller diameter that is to be joined to a second tube with a larger diameter contains an interconnection member disposed within the swaged end of the tube. The interconnection member is a button that is spring-biased to extend through a hole in the swaged tube. The end of the swaged tube also includes two slots, disposed on opposing sides of the tube, that receive within them a rivet that extends transversely through the larger diameter tube. As the swaged tube is inserted into the larger diameter tube, the button in the swaged tube springs into a corresponding hole in the larger diameter tube when the holes in the swaged tube and the large diameter tube are in alignment. Alignment of the button holes also aligns the slots of the swaged tube with the transversely extending rivet in the larger diameter tube such that the rivet is received within the slots of the swaged tube. Any rotational force that is applied to either tube will be resisted due to the rigid engagement of the rivet with the sides of the slots that are disposed on opposing sides of the swaged tube.

11 Claims, 4 Drawing Sheets

APPARATUS AND METHOD FOR COUPLING SUPPORT MEMBERS

BACKGROUND OF THE INVENTION

The present invention relates to connectors for tubular structural members.

Swings, other juvenile products such as playpens and strollers, and other products that use metal tubes as structural elements are commonly packaged with some or all of the tubes separated to minimize the size of the package, and are assembled by the end user. A common technique for joining two tubes end-to-end (along a common longitudinal axis) is to swage the end of one of the tubes (to reduce its diameter) and to sleeve the swaged end into the end of the other tube. The tubes are prevented from separating longitudinally by fixing a mechanical fastener to the mating ends of both tubes, typically by one of two techniques. The first technique involves drilling mating holes though one or both walls of both tubes and placing a fastener such as a screw (if holes are drilled through one wall) or a nut and bolt (if both walls are drilled) through the holes. This technique produces a connection that is generally highly resistant to relative axial and angular movement of the tubes. However, it requires the end user to use tools (screwdriver and/or wrenches) to fasten the tubes and makes it relatively inconvenient to disassemble and reassemble the tubes. The second technique again involves drilling mating holes through one wall of the tubes, and placing a spring-loaded button inside the swaged tube and protruding through the hole in the swaged tube. When the other tube is sleeved onto the swaged tube and the hole in that tube aligned with the button, the button springs into the hole, fastening the tubes. Although this allows assembly without tools and permits ready disassembly and reassembly (by pressing the button radially inwardly into the swaged tube to clear the hole in the other tube and pulling the tube free), the connection is not as resistant to relative movement of the tubes as is the first technique. This is because the holes must be formed slightly larger than the outside diameter of the button to ensure that the button can freely move through the holes. The slight relative axial movement allowed by this connection technique is usually not problematic. However, the relative angular movement is problematic in situations where either or both tubes are connected to structure that is substantially spaced from the tubes' common longitudinal axis and that relies on angular registry of the tubes for proper relative positioning. In such situations, a slight relative angular movement at the joint can translate to substantial mispositioning of the related structures. A joint that is easily assembled and disassembled without tools yet which provides good resistance to relative angular movement of the connected tubes would therefore be desirable.

SUMMARY OF THE INVENTION

The drawbacks of the connection devices that are known are overcome by the present invention which provides for ease in joining two tubes together without requiring tools and which is highly resistant to relative rotational movement of the two tubes. Through the use of the present invention, structure supported by the connected tubes is rigidly positioned and will not be subject to mispositioning due to relative rotational movement of the tubes.

In accordance with the present invention, a tube with a swaged end of smaller diameter that is to be joined to a second tube with a larger diameter contains an interconnection member disposed within the swaged end of the tube for connecting the two tubes. The interconnection member is a button that is spring-biased to extend through a hole in the swaged tube. The end of the swaged tube also includes two slots, disposed on opposing sides of the tube, that receive within them the shaft of a rivet that extends transversely through the larger diameter tube. As the swaged tube is inserted into the larger diameter tube, the button in the swaged tube springs into a corresponding hole in the larger diameter tube when the holes in the swaged tube and the large diameter tube are in alignment. The two tubes are thus coupled to prevent axial separation. Since the button loosely engages the holes in the two tubes, the tubes can rotate slightly relative to each other. To reduce the amount of possible relative rotational movement of the two tubes, the slots of the swaged tube receive the transversely extending rivet in the larger diameter tube. Because the slots and the rivet are sized for a tight fit, the possible relative rotational movement is very small, since, any rotational force that is applied to either tube will be resisted by the engagement of the rivet with the sides of the slots that are disposed on opposing sides of the swaged tube. Thus, relative rotational movement of the two tubes is closely controlled.

The present invention provides for both connection of two tubes to prevent axial disengagement and close control of relative rotational movement of the two tubes. This stable positioning of the two tubes is achieved by a relatively simple joint that provides for easy assembly and disassembly of the tubes without tools.

DETAILED DESCRIPTION

Figure 1:
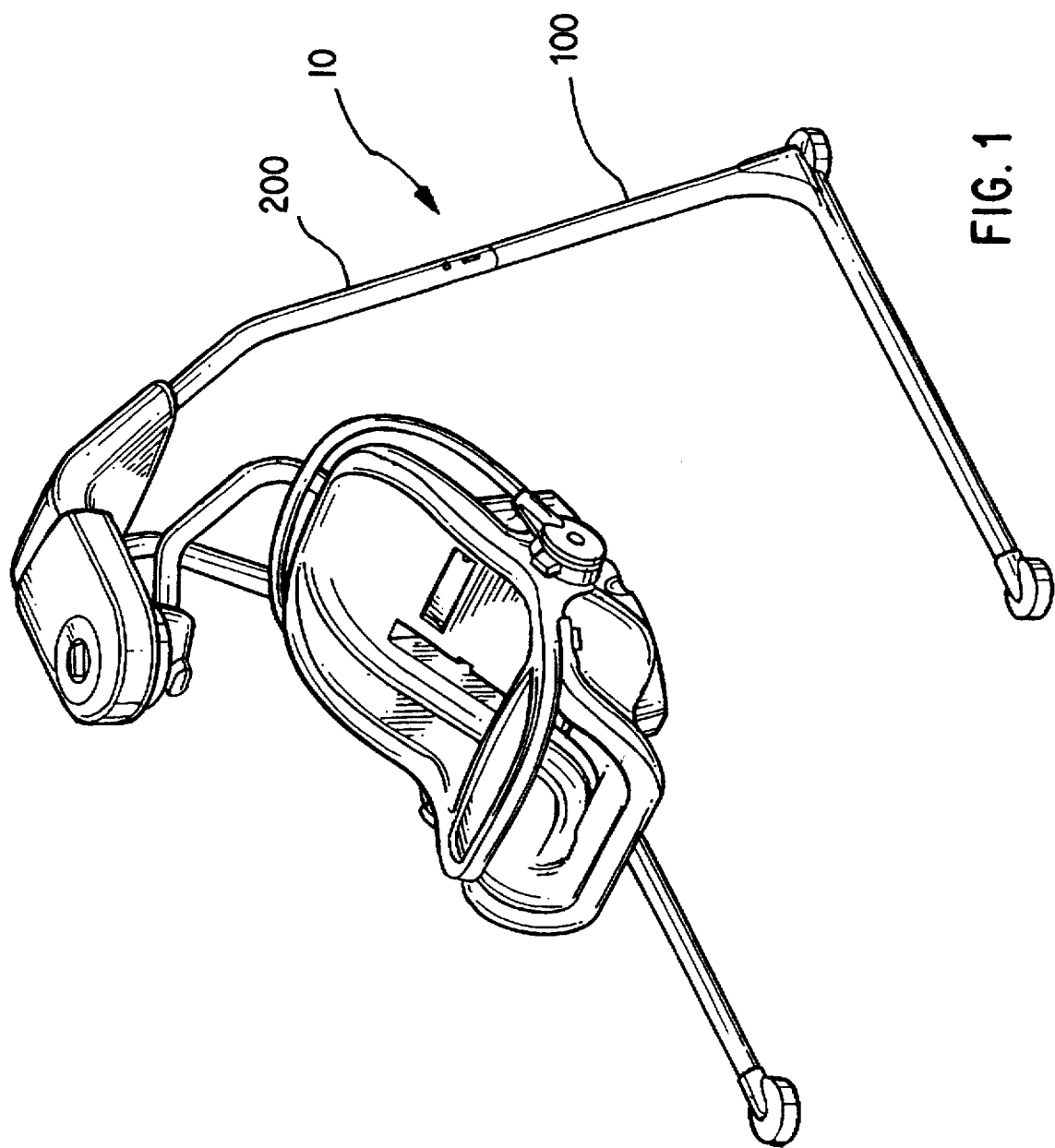
FIG. 1 is a perspective view of the joint as used in the context of a leg of an infant swing.

A joint embodying the principles of the present invention is illustrated in FIG. 1 in the context of an infant swing. The swing has angled, C-shaped legs that are subjected to torque about the axis of the vertical portion of the leg. In the swing shown, the legs are constructed with lower and upper tubular leg sections 100, 200 joined at a joint 10. Since the swing is shown only to illustrate an application for the joint of the invention, in the remainder of the application, the leg sections are referred to as first and second support members 100, 200.

Figure 2:
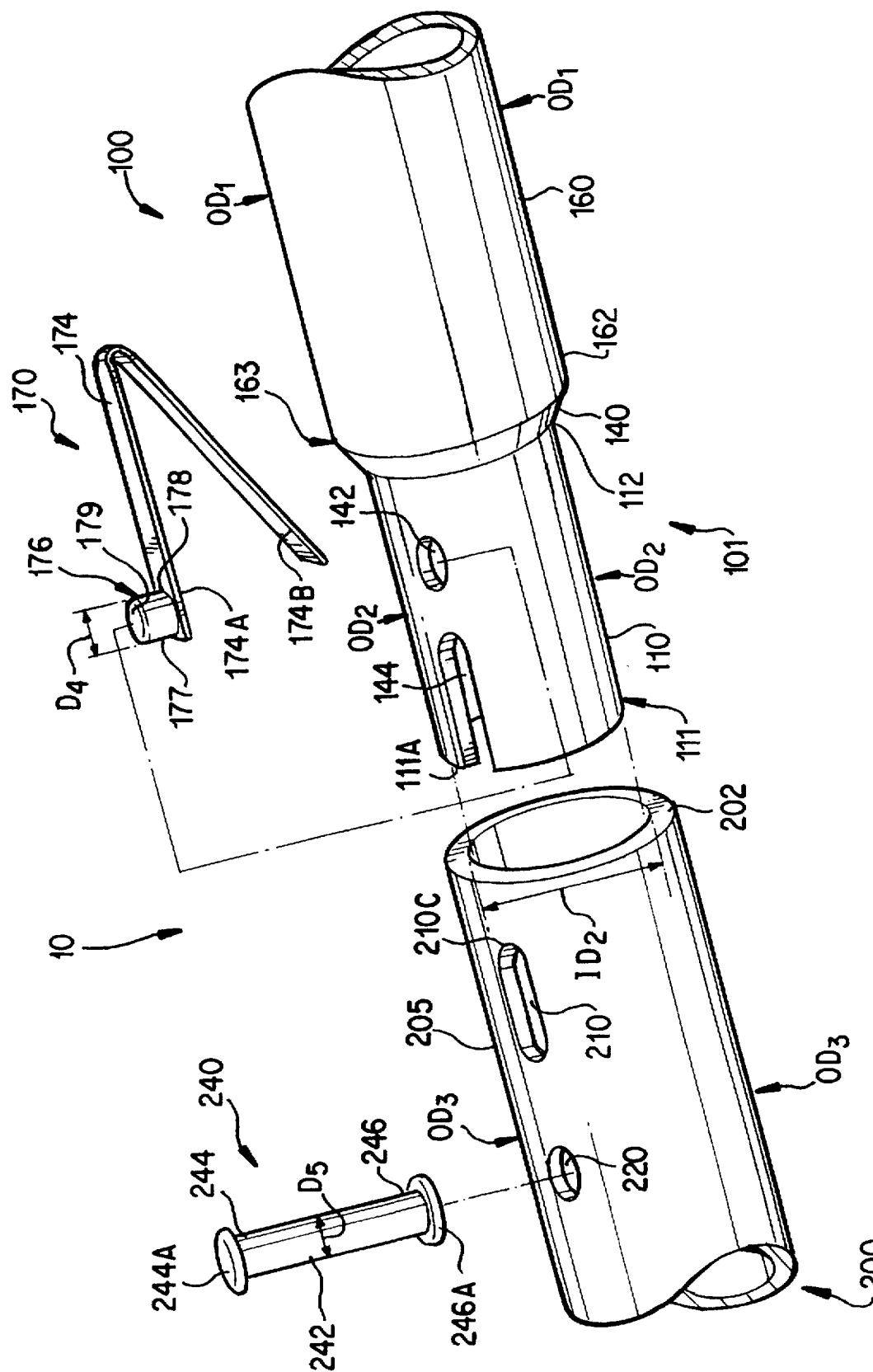
FIG. 2 is an exploded perspective view of the joint of FIG. 1.

As shown in FIG. 2, joint 10 includes a first support member 100, second support member 200, connecting member 170, and rivet 240.

Figure 3:
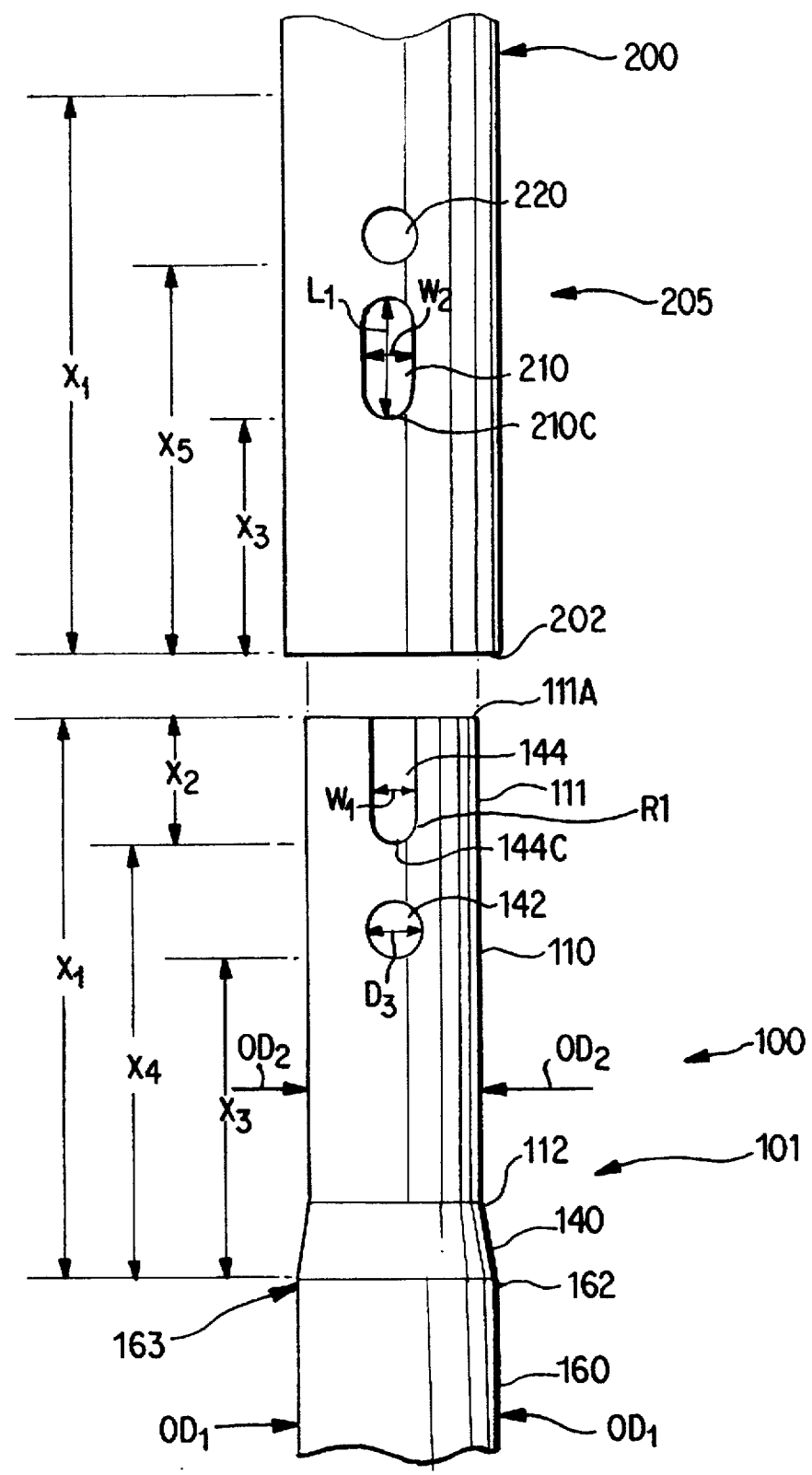
FIG. 3 is a side elevational view of the two support members of FIG. 1.

As best seen in FIGS. 2 and 3, the first support member 100 is an elongated, hollow bore, tube with a swaged joint end that has a large diameter first portion 160, a transitional second portion 140 of decreasing diameter, and a smaller diameter third portion 110. First portion 160 has an axially inner end 162 from which second portion 140 extends axially and radially inwardly to axially outer end 112 of third portion 110. (For definitional purposes herein, axial inner and outer directions are defined as toward and away from the joint ends of the support members, while radially inner and outer directions are defined as toward and away from the longitudinal axes of the support members individually or collectively when joined on a common axis.) Third portion 110 extends from axially outer end 112 to an axially inner edge 111A of support member 100.

The transition point between first portion 160 and second portion 140 defines shoulder 163. Second portion 140 and third portion 110, together extending a distance $X_1$ from shoulder 163 comprise the swaged joint end 101 of support member 100.

Inner end 111 of third portion 110 includes radially opposed first and second elongated rivet slots 144 and 147. Rivet slots 144, 147 are cut into the wall of third portion 110 from inner edge 111A and extend longitudinally a distance $X_2$ toward shoulder 163 to their axially outer ends 144C, 147C, respectively, which have a radius of curvature $R_1$. Slots 144, 147 have a width $W_1$ (twice $R_1$). The slot outer ends 144C, 147C are positioned a distance $X_4$ from shoulder 163.

Inner end 111 of third portion 110 further includes circular button aperture 142, which is a circular opening in the wall of third portion 110 disposed axially outwardly of, and aligned axially with, slot 144, and has a diameter $D_3$. The axially outer end of button aperture 142 is positioned a distance $X_3$ from shoulder 163.

First portion 160 has an outside diameter $OD_1$, while third portion 110 has an outside diameter $OD_2$ and an inside diameter $ID_1$.

As seen in FIG. 2, connecting member 170 includes V-shaped flat spring 174 and button 176 fixed at its radially inner end 178 to a first end 174A of spring 174. Button 176 has a cylindrical body portion 177 with diameter $D_4$ and a radially outer end 179. Connecting member 170 is disposed within third portion 110 of support member 100 with second end 174B of spring 174 engaging the interior wall of third portion 110 and with spring 174 biasing outer end 179 of button 176 through button aperture 142. Diameter $D_4$ of cylindrical body portion 177 is slightly smaller than diameter $D_3$ of aperture 142 so that button 176 can extend through aperture 142.

Second support member 200 is a cylindrical tube that has a joint end 205 of uniform outside diameter $OD_3$ and inside diameter $ID_2$ and terminates at an axially inner end 202. Outside diameter $OD_3$ of support member 200 and $OD_1$ of first portion 160 of support member 100 are substantially the same, whereas inside diameter $ID_2$ of inner end 202 is slightly greater than outside diameter $OD_2$ of third portion 110, so that third portion 110 is slidably receivable in the inner bore of inner end 202.

Joint end 205 includes a button receiving aperture 210, which is an elongated hole that extends through the wall of joint end 205 and has a width $W_2$ that is approximately equal to diameter D3 of button hole 142 (and thus slightly greater than the outside diameter $D_4$ of button 176), and a length $L_1$ substantially greater than width $W_2$. The axially inner end 210C of aperture 210 is positioned a distance $X_3$ from inner end 202 of joint end 205.

Joint end 205 also contains first and second radially opposed rivet receiving apertures 220, 221 axially aligned with aperture 210. A rivet 240 is positioned in apertures 220, 221. Rivet 240 has an elongated, cylindrical shaft 242 of diameter $D_5$, that extends through joint end 205, transverse to its longitudinal axis, and into and through apertures 220, 221. Diameter $D_5$ of shaft 242 is slightly smaller than width $W_1$ of slots 144, 147 and the inside diameter of apertures 220, 221 so that shaft 242 can be securely received within slots 144, 147 and through apertures 220, 221. Each end 244, 246 of rivet 240 has a head 244A, 246A disposed on it that is positioned external of, and in firm engagement with, the outer surface of joint end 205 when rivet 240 is positioned through member 200. Rivet 240 is positioned with its axially inner edge spaced a distance $X_5$ from inner end 202.

Aperture 210 of member 200 and slots 144, 147 of member 100 are elongated so that sufficient margin is provided for positioning button 176 within aperture 210 and rivet shaft 242 in slots 144, 147. This margin is required due to the swaging of member 100, which results in a relatively high degree of axial dimensional inaccuracy.

Figure 4:
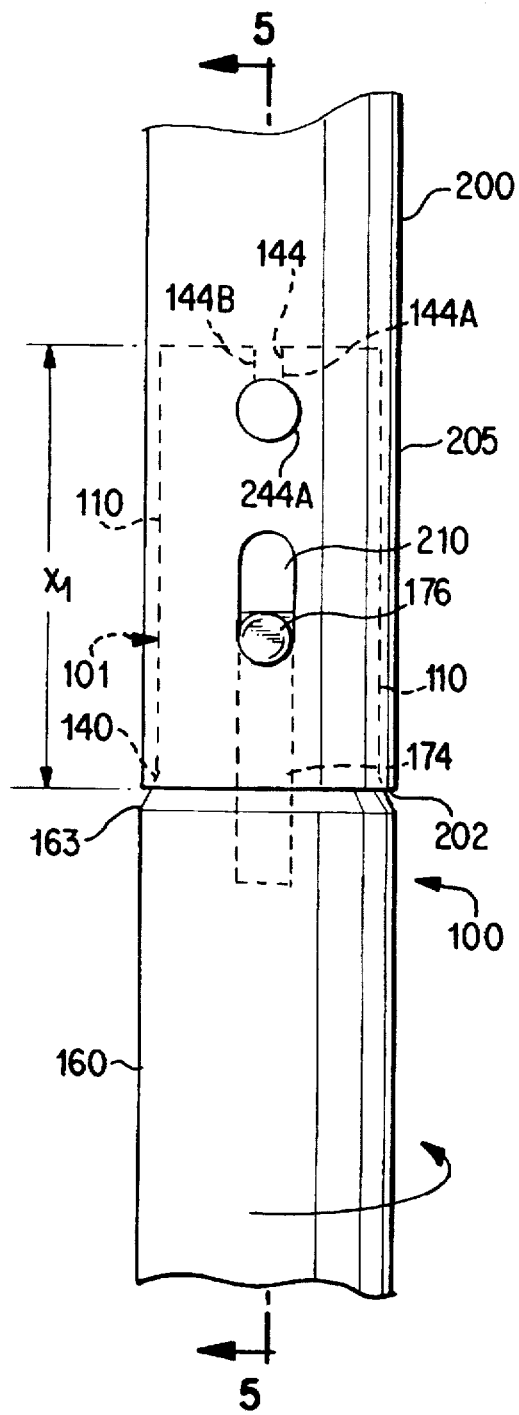
FIG. 4 is a side elevational view of the joint of FIG. 1
Figure 5:
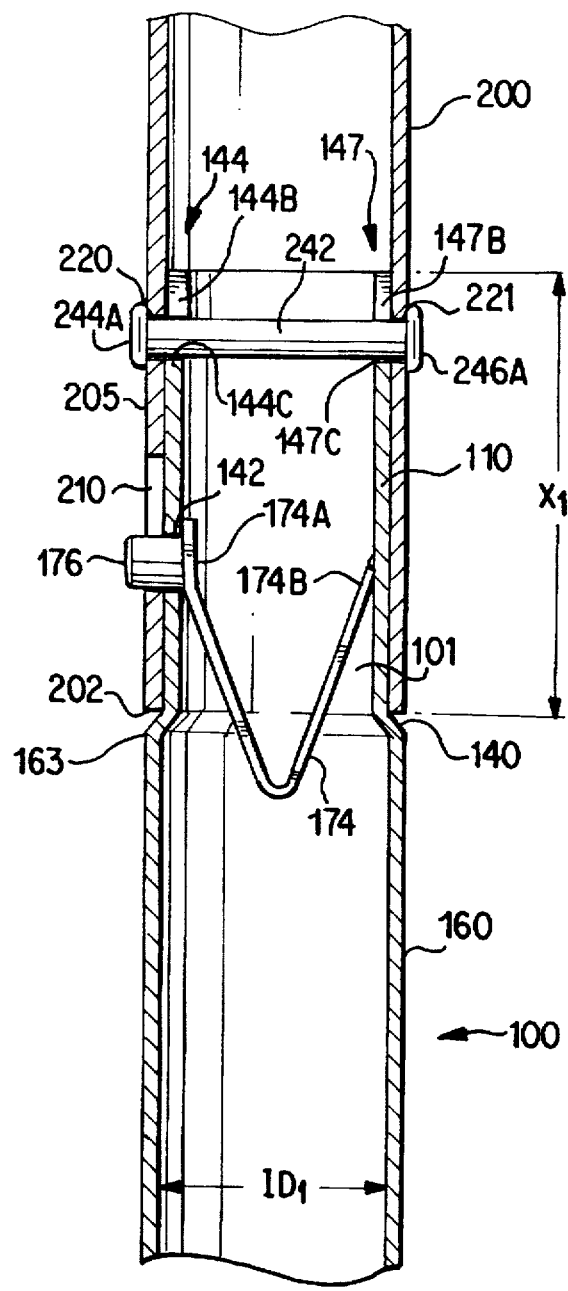
FIG. 5 is a cross-sectional view of the joint of FIG. 1 taken along line 5—5 of FIG. 4.

Joint 10 is shown in its engaged condition in FIGS. 4 and 5. When the joint is engaged, swaged joint end 101 of support member 100 is disposed inside joint end 205 of support member 200, and axially inner end 202 of member 200 is positioned adjacent to shoulder 163 of member 100. Button 176 is disposed in button apertures 142 and 210, and rivet shaft 242 is disposed in slots 144, 147.

Joint ends 101 and 205 are joined in the engaged state by axially aligning the joint ends so that the longitudinal centerlines of button 176 and button aperture 210 are in alignment. When button 176 and button aperture 210 are in alignment, slots 144, 147 are also properly oriented to receive rivet 240 within them. Button 176 is depressed into member 100 by applying a force to the button's outer end 179 sufficient to overcome the biasing force of spring 174 and is maintained in the depressed position while third portion 110 of member 100, with smaller outside diameter $OD_2$, is inserted into joint end 205 of member 200, with larger inside diameter $ID_2$. Joint end 101 is inserted into joint end 205 a distance $X_1$ until end 202 of member 200 rests on shoulder 163.

When joint end 101 is inserted into joint end 205 in proper axial alignment and to distance $X_1$, button aperture 142 will align with button receiving aperture 210, and spring 174 will urge button 176 radially outwardly to extend through aperture 210. Thus, connecting member 170 connects joint end 101 within joint end 205 to prevent axial separation.

As joint end 101 is inserted into joint end 205, in addition to connecting member 170 engaging joint end 205, first and second ends 244, 246 of rivet shaft 242 will enter and slide inside first and second rivet slots 144, 147, respectively.

Since button aperture 210 is substantially larger than button body portion 177, button 176 can move axially in button aperture 210. Similarly, rivet shaft 242 can move axially in slots 144, 147. Thus, joint ends 101 and 205 can move axially with respect to each other. However, relative rotational movement of the two joint ends is limited by the engagement of rivet shaft 242 with the sides of slots 144, 147. If a rotational force is applied to member 100 as shown in FIG. 4, left side 144B of slot 144, in fixed engagement with rivet 240, and left side 147B of slot 147 (not shown) in fixed engagement with rivet 240, will limit the relative rotational movement of support members 100 and 200. If a force is applied in the opposite direction, the right sides 144A, 147A of slots 144, 147, respectively, will interact with rivet 240 to prevent relative rotational movement. Since shaft 242 diameter $D_5$ and slot width $W_1$ can be adjusted to be very nearly the same (just sufficiently different to permit rivet shaft 242 to slide through slots 144,147), and their dimensions controlled to fairly close tolerances, close control over relative rotation can be achieved.

To disengage joint 10, button 176 is depressed radially inwardly until it withdraws from button aperture 210, and joint end 101 is then withdrawn axially from joint end 205.

In this manner, a joint is provided that allows for ease in connecting two support members without requiring the use of tools and that also prevents relative rotational movement of the support members.

Several variations on the disclosed embodiment are contemplated. Although rivet 240, disposed within second support member 200, and slots 144, 147 in first support member 100, are positioned in the same angular orientation as button apertures 142 and 210, they are not required to be. Rivet 240 and slots 144, 147 can be positioned in any angular orientation relative to apertures 142, 210. Additionally, rivet 240 is not required to extend completely through support member 200. Posts internal to support member 200, disposed on opposing internal sidewalls and positioned to be received within slots 144, 147, could also be utilized.

Connection member 170 is disclosed as spring 174 and button 176 disposed within support member 100, however, the connection member can be any number of different structures and can be positioned externally to the support members. For example, the connection member can be a cylindrical pin that is mounted on the outside of the larger diameter support member such that as the swaged member is inserted into the larger diameter member, the pin is inserted through corresponding holes in the two support members. The pin can be biased into an engagement position or can be secured in position through other structural means, namely, a cotter pin inserted through the end of a pin that would extend entirely through both support members.

Cylindrical tubes are disclosed as comprising support members 100 and 200 in the disclosed embodiment, however, the invention is not limited to cylindrical tubes. The joint is equally capable of being applied in the context where two rectangular, or other geometrically shaped, support members are required to be joined and securely positioned to prevent relative rotational movement.

What is claimed is:

1. A joint for connecting two support members comprising:
   a first swaged tubular support member having a first portion having a first outside diameter, a third, end portion having a second outside diameter smaller than said first outside diameter, a wall, a longitudinal axis, an end, and a slot formed in said wall and extending axially from said end, and a second portion extending between said first and third portions, and tapering inwardly in diameter from said first portion to said third portion;
   a second tubular support member having an inner bore bounded by a wall with an inside diameter larger than said second outside diameter, a first aperture in said wall of said second support member, and an elongate rotation restraint member disposed in said bore and extending radially inwardly from said wall, said first support member being slidingly receivable within said bore of said second support member; and
   a connecting member coupled to said first support member and selectively extendable radially outwardly from said wall of said first support member to an extended position and being engageable with said aperture when in said extended position and when said first support member is disposed in said second support member with said rotation restraint member disposed in said slot,
   engagement of said connecting member with said aperture preventing axial withdrawal of said first support member from said second member, and engagement of said rotation restraining member and said slot preventing rotation of said first support member with respect to said second support member.

2. The joint of claim 1 wherein said second portion tapers with a linearly decreasing diameter as said second portion extends from said first portion to said third portion.

3. The joint of claim 2 wherein said slot is formed in said third portion.

4. The joint of claim 3 wherein said connecting member is a v-shaped flat spring disposed within said second portion of said first support member with a button disposed on a first end of said spring and a second end of said spring supported against an internal sidewall of said third portion of said first support member, where said button is biased into an engagement position through said first aperture to fixedly join said first and second support members.

5. The joint of claim 1 wherein:
   said first support member has an inner bore and a second aperture extending from said bore through said wall of said third portion;
   said connecting member has a v-shaped flat spring disposed within said inner bore with a first end engaged with a portion of said inner bore radially opposite said second aperture and a button disposed on the opposite end of said spring and disposed in said second aperture, said button being biased by said spring into said extended position.

6. The joint of claim 5 wherein said second aperture is axially aligned with said slot.

7. A joint for connecting two support members comprising:
   a first tubular support member having a wall with an outside diameter, a longitudinal axis, an end, and a slot formed in said wall and extending axially from said end;
   a second tubular support member having an inner bore bounded by a wall with an inside diameter larger than said outside diameter of said first support member, a first aperture in said wall of said second support member, and an elongate rotation restraint member disposed in said bore and extending radially inwardly from said wall, said first support member being slidingly receivable within said bore of said second support member; and
   a connecting member coupled to said first support member and selectively extendable radially outwardly from said wall of said first support member to an extended position and being engageable with said aperture when in said extended position and when said first support member is disposed in said second support member with said rotation restraint member disposed in said slot,
   engagement of said connecting member with said aperture preventing axial withdrawal of said first support member from said second member, and engagement of said rotation restraining member and said slot preventing rotation of said first support member with respect to said second support member,
   wherein said first support member has an inner bore and a second aperture extending from said bore through said wall;
   said connecting member has a v-shaped flat spring disposed within said inner bore with a first end engaged with a portion of said inner bore radially opposite said second aperture and a button disposed on the opposite end of said spring and disposed in said second aperture, said button being biased by said spring into said extended position.

8. The joint of claim 7 wherein said second aperture is axially aligned with said slot.

9. A joint for connecting two support members comprising:

a first swaged tubular support member having a first portion, a second portion and a third portion, where said first portion has a first diameter, said third portion has a second diameter smaller than said first diameter, and said second portion extends between said first portion and said third portion and has a linearly decreasing diameter as said second portion extends from said first portion to said third portion;

said third portion having a first aperture in a sidewall and first and second slots formed in the end of said third portion;

a second tubular support member of same diameter as said first portion of said first support member, a second aperture in a sidewall of said second support member, and a rotation restraint member disposed internal to said second support member, wherein said second support member internally receives said second and third portions of said first support member; and a connecting member removably positioned in said first and second apertures to fixedly join said first and second support members, wherein said first and second slots in said third portion of said first support member receive said rotation restraint member within said slots when said first support member is inserted into said second support member to restrict relative rotational movement of said first support member and said second support member.

10. The joint of claim 9 wherein said connecting member is a v-shaped flat spring disposed within said third portion of said first support member with a button disposed on a first end of said spring and a second end of said spring supported against the internal sidewall of said third portion of said first support member, where said button is biased into an engagement position through said first and second apertures to fixedly join said first and second support members.

11. A joint for connecting two support members comprising:

a first swaged cylindrical tube having a first portion, a second portion and a third portion, where said first portion has a first diameter, said third portion has a second diameter smaller than said first diameter, and said second portion extends between said first portion and said third portion and has a linearly decreasing diameter as said second portion extends from said first portion to said third portion;

said third portion having a first aperture in a sidewall and first and second slots formed in the end of said third portion, where the longitudinal axis of said first slot and said aperture are aligned, and where said first and second slots are positioned 180° with respect to each other on opposing sidewalls of said third portion;

a second cylindrical tube of same diameter as said first portion of said first tube, having an elongated aperture larger than said first aperture of said third portion, first and second circular apertures positioned 180° with respect to each other on opposing sidewalls of said second tube, where the longitudinal axis of said first aperture and said elongated aperture are aligned, and a rivet disposed within said second tube and extending through said first and second circular apertures, where said second and third portions of said first tube are received within said second tube; and a v-shaped flat spring disposed within said third portion of said first tube with a button disposed on a first end of said spring and a second end of said spring is supported against the internal sidewall of said third portion of said first tube, where said button is biased into an engagement position through said first aperture of said third portion and said elongated aperture of said second tube to fixedly join said first and second tubes, wherein said first and second slots formed in said third portion of said first tube receive said rivet within said slots when said second and third portions of said first tube are inserted into said second tube to restrict relative rotational movement of said first tube and said second tube.

* * * * *

UNITED STATES PATENT AND TRADEMARK OFFICE
Certificate

Patent No. 5,779,386                                         Patented: July 14, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Anthony E. Eichorn, East Amherst, NY; and John Maul, Machias, NY.

Signed and Sealed this Twenty-fifth Day of March 2003.

*DANIEL P. STODOLA*
*Supervisory Patent Examiner*
*Art Unit 3634*